United States Patent
Kutomi

(10) Patent No.: US 9,817,237 B2
(45) Date of Patent: Nov. 14, 2017

(54) HEAD-UP DISPLAY DEVICE

(71) Applicant: DENSO CORPORATION, Kariya, Aichi-pref. (JP)

(72) Inventor: Shinji Kutomi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/303,307

(22) PCT Filed: Apr. 6, 2015

(86) PCT No.: PCT/JP2015/001918
§ 371 (c)(1),
(2) Date: Oct. 11, 2016

(87) PCT Pub. No.: WO2015/159500
PCT Pub. Date: Oct. 22, 2015

(65) Prior Publication Data
US 2017/0038595 A1 Feb. 9, 2017

(30) Foreign Application Priority Data

Apr. 16, 2014 (JP) ................................. 2014-084701

(51) Int. Cl.
*G09G 5/00* (2006.01)
*G02B 27/01* (2006.01)
(Continued)

(52) U.S. Cl.
CPC .......... *G02B 27/0179* (2013.01); *B60K 35/00* (2013.01); *G02B 27/01* (2013.01);
(Continued)

(58) Field of Classification Search
CPC ................ G02B 27/0179; G02B 27/01; G02B 2027/0196; G02B 2027/014;
(Continued)

(56) References Cited

U.S. PATENT DOCUMENTS 5,269,687 A * 12/1993 Mott ....................... A63F 13/10
273/454
5,757,268 A * 5/1998 Toffolo ................... B60K 35/00
340/459

(Continued)

FOREIGN PATENT DOCUMENTS

JP 2003291688 A 10/2003
JP 2005029067 A 2/2005
(Continued)

*Primary Examiner* — Robert Craddock
(74) *Attorney, Agent, or Firm* — Harness, Dickey & Pierce, P.L.C.

(57) ABSTRACT

A head-up display device includes: an optical unit that projects picture light toward a front windshield of a vehicle, and that displays picture information reflected on the front windshield as a virtual image; a display controller that controls the optical unit so as to display the picture information on the front windshield; and a vehicle state identifying device that identifies a vehicle state. The display control device controls the optical unit so as to move the display position of the picture information in a direction in which the field of view of a driver of the vehicle can be secured according to the vehicle state identified by the vehicle state identifying device.

10 Claims, 7 Drawing Sheets

(51) Int. Cl.
  *B60K 35/00* (2006.01)
  *G06K 9/00* (2006.01)
  *G06T 19/00* (2011.01)
  *G06T 19/20* (2011.01)
  *H04N 9/31* (2006.01)

(52) U.S. Cl.
  CPC ..... *G02B 27/0101* (2013.01); *G06K 9/00791* (2013.01); *G06T 19/006* (2013.01); *G06T 19/20* (2013.01); *H04N 9/3179* (2013.01); *B60K 2350/1072* (2013.01); *B60K 2350/2052* (2013.01); *B60K 2350/2056* (2013.01); *B60K 2350/352* (2013.01); *B60K 2350/905* (2013.01); *B60K 2350/962* (2013.01); *G02B 2027/014* (2013.01); *G02B 2027/0183* (2013.01); *G02B 2027/0187* (2013.01); *G02B 2027/0196* (2013.01); *G06T 2207/30252* (2013.01)

(58) Field of Classification Search
  CPC ........ G02B 2027/0187; G02B 27/0101; G02B 2027/0183; B60K 35/00; B60K 2350/1072; B60K 2350/2052; B60K 2350/2056; B60K 2350/352; B60K 2350/905; B60K 2350/962; G06K 9/00791; G06T 19/006; G06T 19/20; G06T 2207/30252; H04N 9/3179
  USPC ........................................................ 345/633
  See application file for complete search history.

(56) References Cited

U.S. PATENT DOCUMENTS

| 7,940,285 | B2* | 5/2011 | Would ................. G06F 3/0482 345/629 |
| 9,691,182 | B1* | 6/2017 | Katzer ................. G06T 19/006 |
| 2007/0210906 | A1* | 9/2007 | Knoll ..................... B60K 35/00 340/461 |
| 2012/0050138 | A1 | 3/2012 | Sato et al. |

FOREIGN PATENT DOCUMENTS

| JP | 2007099199 A | 4/2007 |
| JP | 2010256878 A | 11/2010 |
| JP | 2011002660 A | 1/2011 |
| JP | 2012096731 A | 5/2012 |

* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2015/001918 filed on Apr. 6, 2015 and published in Japanese as WO 2015/159500 A1 on Oct. 22, 2015. This application is based on and claims the benefit of priority from Japanese Patent Application No. 2014-084701 filed on Apr. 16, 2014. The entire disclosures of all of the above applications are incorporated herein by reference.

TECHNICAL FIELD

The present disclosure relates to a head-up display device.

BACKGROUND ART

This type of device detects the driver's sight line and the pointing direction, as well as agreement of the sight line with the pointing direction. When the driver moves the sight line and the pointing direction to a display screen to be moved, the display screen in which the sight line agrees with the pointing direction is selected as a screen to be moved, and when the driver moves the sight line and the pointing direction to a desired position, the screen to be moved is moved to the position where the sight line does not agree with the pointing direction (Refer to, for example, Patent literature 1).

In driving the vehicle, the driver has to automatically move his/her sight line according to the vehicle state. For example, the driver moves the sight line downward in an ascending slope, moves the sight line upward in a descending slope, moves the sight line to right at right turn, and moves the sight line to left at left turn.

The device described in Patent literature 1 enables the display screen to be moved to a position desired by the occupant. However, since the display position of the display screen is fixed even when the driver must spontaneously move the sight line according to the vehicle state, the frontal field of view may be disadvantageously disturbed according to picture information.

PRIOR ART LITERATURES

Patent Literature

Patent Literature 1: JP2007-99199A

SUMMARY OF INVENTION

It is an object of the present disclosure to display picture information at the display position suitable for the vehicle state.

To achieve the above object, a first aspect of the present embodiment includes: an optical unit that projects picture light toward a front windshield of a vehicle, and displays picture information reflected on the front windshield as a virtual image; a display controller that controls the optical unit so as to display the picture information on the front windshield; and a vehicle state identification unit that identifies a vehicle state. The display controller controls the optical unit so as to move the display position of the picture information in a direction in which the field of view of a driver of the vehicle is secured according to the vehicle state identified by the vehicle state identification unit.

With such configuration, since the display controller controls the optical unit so as to move the display position of the picture information in the direction in which the field of view of a driver of the vehicle is secured according to the vehicle state, the picture information can be displayed at the display position suitable for the vehicle state.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
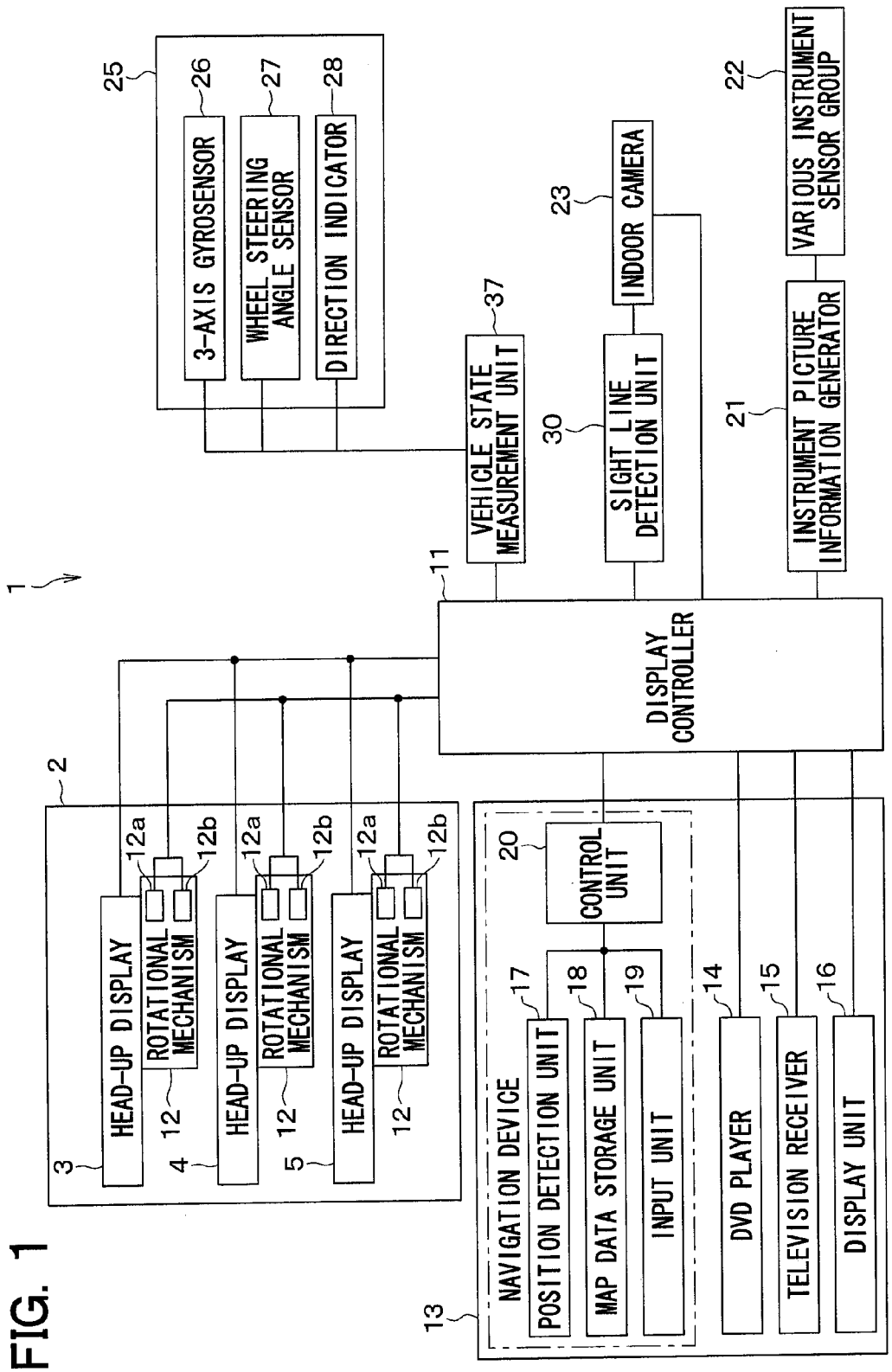
FIG. 1 is a view illustrating configuration of a head-up display device according to an embodiment of the present disclosure.
Figure 2:
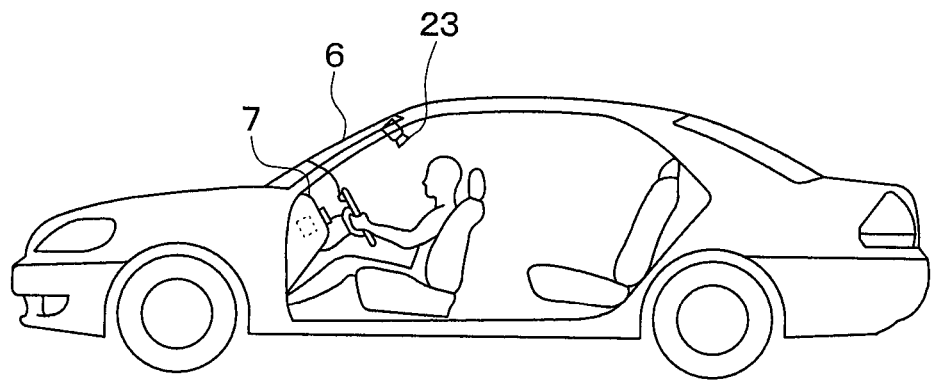
FIG. 2 is a view illustrating arrangement of each component in a vehicle.

FIG. 1 illustrates whole configuration of a head-up display device according to an embodiment of present disclosure. The head-up display device 1 of the present embodiment is mounted in a vehicle, and includes an optical unit 2, a display controller 11, a vehicle state measurement unit 37, an indoor camera 23, and a sight line detection unit 30. The optical unit 2 includes multiple, for example, three head-up displays 3 to 5. As illustrated in FIG. 2, the head-up displays 3 to 5 project individual images on a transparent front windshield 6. Hereinafter, the front windshield 6 may be referred to as a wind glass 6.

Figure 3:
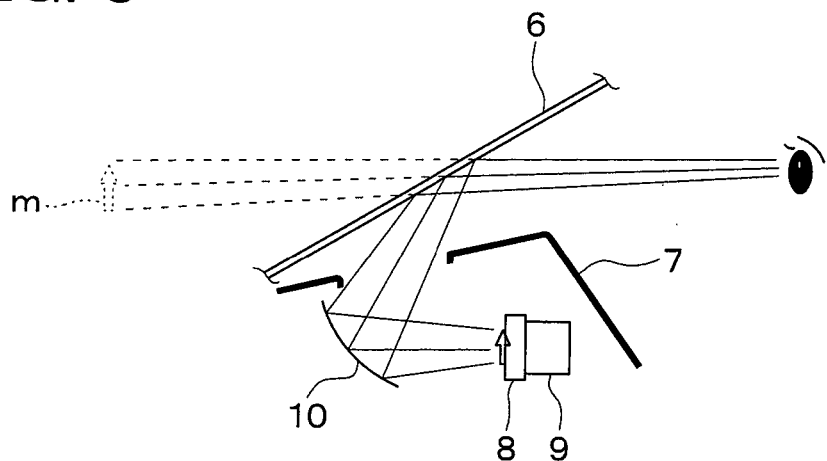
FIG. 3 is a view of display of a virtual image using a head-up display.

FIG. 3 illustrates the principle that the head-up displays 3 to 5 each project an image on the wind glass 6. That is, the head-up displays 3 to 5 each are disposed in an instrument panel 7 of the vehicle illustrated in FIG. 2, and include a TFT liquid crystal panel 8 that is a display unit, a backlight 9, and a mirror 10. The liquid crystal panel 8 acquires picture information from the display controller 11, receives light from the backlight 9, and displays the picture information as an image. Display light of the image outputted from the liquid crystal panel 8 is reflected on the mirror 10 toward the wind glass 6, thereby forming a virtual image m in front of the wind glass 6. In this case, the virtual image m is formed in front of the wind glass 6 and however, appears as if the image is projected on the wind glass 6. Therefore, the image formed as the virtual image m is handled as a display screen projected on the wind glass 6.

In the present embodiment, each of the head-up displays 3 to 5 is configured so as to freely vary its orientation in all directions. Varying the orientation transfers the position of the display screen projected on the wind glass 6. The orientation of the liquid crystal panel 8 and the backlight 9 is automatically varied using a rotational mechanism 12. The rotational mechanism 12 supports the liquid crystal panel 8 and the backlight 9 such that the liquid crystal panel 8 and the backlight 9 rotate about two axes that are orthogonal to each other, and rotate about one axis and about the other axis using two respective stepping motors 12a, 12b.

The display controller 11 is connected to each of the head-up displays 3 to 5. The display controller 11 is configured of a computer including a CPU, a RAM, a ROM, and an I/O, and the CPU executes various processing according to a program stored in the ROM.

The vehicle state measurement unit 37 is connected to the display controller 11. A vehicle state measurement sensor group 25 is connected to the vehicle state measurement unit 37. The vehicle state measurement sensor group 25 includes a 3-axis gyrosensor 26, a wheel steering angle sensor 27, and a direction indicator 28.

The 3-axis gyrosensor 26 outputs a signal corresponding to the attitude of the vehicle, and outputs angular velocity information indicating the angular velocity in 3-axis directions including a pitch direction, a roll direction, and a yaw direction.

The wheel steering angle sensor 27 outputs steering angle information corresponding to the rotational angle of a steering wheel of the vehicle.

The direction indicator 28 has a direction indicator lamp (winker) and a direction indication lever (which are not illustrated) of the vehicle, and causes the direction indicator lamp of the vehicle to flash according to the user's operation to the direction indication lever. The direction indicator 28 outputs winker information indicating right turn or left turn according to the user's operation to the direction indication lever.

A navigation device 13 is mounted in the vehicle. The navigation device 13 is configured as an integrated audio-video equipment including a radio receiver not illustrated, a CD player, a DVD player 14, and a television receiver 15. A display unit 16 that is a color liquid crystal display for displaying a road map, a video, and a television program is incorporated in the navigation device 13.

The navigation device 13 includes a position detection unit 17, a map data storage unit 18, an input unit 19 formed as a mechanical switch or a touch panel provided on a screen of the display unit 16, and a control unit 20. The control unit 20 detects a current position from the position detection unit 17, acquires map information around the current position from the map data storage unit 18, and outputs picture information of the road map (hereinafter referred to merely as road picture information). The DVD player 14 acquires video information from a DVD, and outputs the video information. The television receiver 15 receives telecasting airwaves, and outputs picture information of the television (hereinafter referred to merely as television picture information).

The road picture information, the video information, and the television picture information are sent to the display controller 11, and are displayed on the display unit 16 of the navigation device 13 under control of the display controller 11. Under control of the display controller 11, the road picture information, the video information, and the television picture information may be sent to the optical unit 2, and be displayed on the wind glass 6. Any of the road picture information, the video information, and the television picture information is displayed on the display unit 16 of the navigation device 13 according to the operation of the input unit 19 of the navigation device 13.

In addition to the navigation device 13, the DVD player 14, and the television receiver 15, an instrument picture information generator 21 is mounted in the vehicle as a source for information to be sent to the display controller 11. The instrument picture information generator 21 acquires measurement data from a various instrument sensor group 22 including a vehicle speed sensor, a remaining fuel amount sensor, an oil pressure sensor, and an engine rotational speed sensor, generates instrument picture information based on the measurement data, and sends the generated instrument picture information to the display controller 11. The display controller 11 sends the instrument picture information to the optical unit 2 to display the instrument picture information on the wind glass 6.

Here, the head-up displays 3 to 5 of the optical unit 2 display different images. The head-up display 3 is dedicated to the road picture information, the head-up display 4 is dedicated to the video information and the television picture information, and the head-up display 5 is dedicated to the instrument picture information.

The display controller 11 in the present embodiment varies the display position of the picture information according to the vehicle state so as not to disturb the driver's field of view, that is, so as to ensure the driver's field of view.

To vary the display position of the picture information according to the vehicle state, as illustrated in FIG. 2, the indoor camera 23 is mounted in the vehicle. The indoor camera 23 is disposed at the center of a front portion of the ceiling of the vehicle, takes an image of the driver's face, and outputs the taken image to the sight line detection unit 30.

The sight line detection unit 30 detects both eyes from the image of the driver's face, which is taken using the indoor camera 23, and the image of both eyes is recognized (for example, pattern matching) to detect a sight line. Also, the image taken with the indoor camera 23 is processed to detect the position (coordinates) of the driver's eyes.

The sight line detection unit 30 determines the sight line (direction) in the three-dimensional manner by recognizing (for example, pattern matching) the facial orientation of the driver, and the direction and extent of the iris of the eye with respect to the face.

The sight line may be detected by using eyeball motion, the boundary between cornea and sclera, an image reflected on cornea, and an image reflected on cornea and pupil. An eye camera (registered trademark) may be used.

Next, referring to FIG. 4 to FIG. 14, processing of the display controller 11 in the head-up display device 1 will be described below. When an ignition switch of the vehicle is turned ON, the head-up display device 1 and the navigation device 13 are activated, and the display controller 11 executes the processing illustrated in FIG. 4 periodically (for example, per second).

Figure 5:
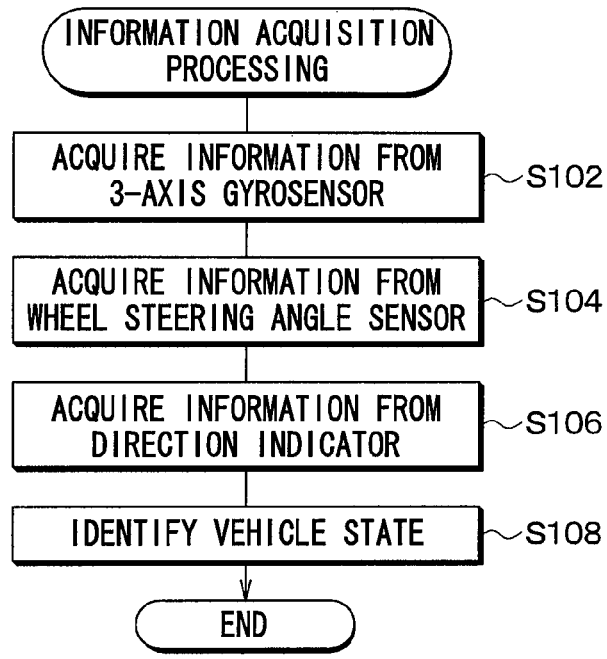
FIG. 5 is a flowchart of information acquisition processing.

First, information acquisition processing is executed (S100). FIG. 5 is a flowchart of the information acquisition processing. In the information acquisition processing, first, angular velocity information is acquired from the 3-axis gyrosensor 26 (S102). Based on the angular velocity in the pitch direction in the angular velocity information, it can be determined which slope (ascending slope or descending slope) the vehicle is travelling on. Based on the angular velocity in the roll direction and in the pitch direction in the angular velocity information, it can be determined whether the vehicle is travelling on a rough road such as an uneven road.

Next, steering angle information corresponding to the rotational angle of the steering wheel of the vehicle is acquired from the wheel steering angle sensor 27 (S104). The steering angle information can be periodically acquired to estimate a vehicle turning angle, based on an amount of change from the previous wheel steering angle to the current steering angel.

Next, winker information is acquired from the direction indicator 28 (S106). Based on the winker information, it can be determined whether the vehicle turns to right or left.

Figure 6:
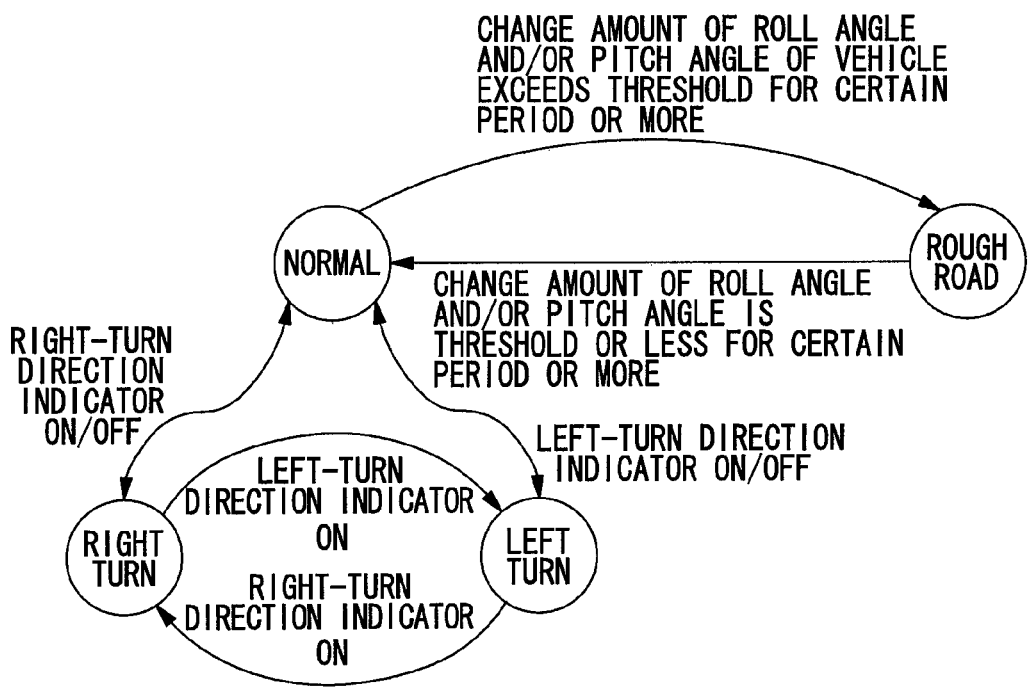
FIG. 6 is a view illustrating transition of vehicle state.

Next, the vehicle state is identified (S108). In the present embodiment, one of four states: "normal", "rough road", "right turn", and "left turn" is identified. FIG. 6 is a view illustrating transition of the vehicle state.

When the winker information indicating left turn is acquired in the state "normal", the state "normal" transitions to the state "left turn", and when the winker information indicating left turn is not acquired in the state "left turn", the state "left turn" returns to the state "normal".

When the winker information indicating right turn is acquired in the state "normal", the state "normal" transitions to the state "right turn", and when the winker information indicating right turn is not acquired in the state "right turn", the state "right turn" returns to the state "normal".

When the winker information indicating right turn is acquired in the state "left turn", the state "left turn" transitions to the state "right turn", and when the winker information indicating left turn is acquired in the state "right turn", the state "right turn" returns to the state "left turn".

When an amount of change in at least one of a roll angle and a pitch angle in the state "normal" exceeds a threshold (for example, 10 degrees) for a certain period (for example, 1 second) or more, the state "normal" transitions to the state "rough road". When the amount of change in at least one of the roll angle and the pitch angle becomes the threshold (for example, 10 degrees) or less in the state "rough road" for the certain period (for example, 1 second) or more, the state "rough road" transitions to the state "normal".

Here, in the "rough road", a rough road flag indicating the "rough road" is stored in the RAM. In the state "right turn", a right turn flag indicating the state "right turn" is stored in the RAM, and in the state "left turn", a left turn flag indicating the state "left turn" is stored in the RAM, to finish this processing.

Figure 4:
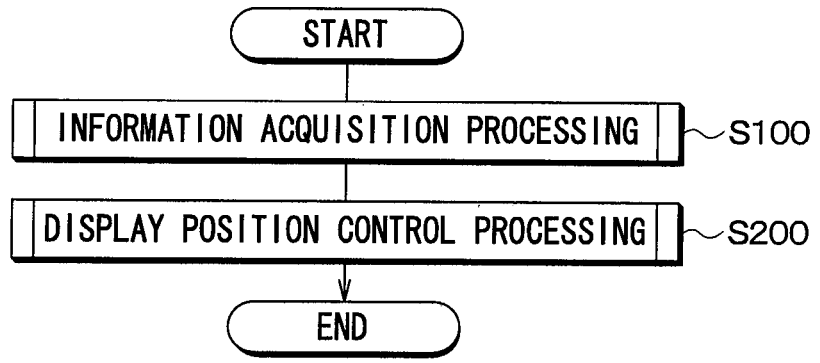
FIG. 4 is a flowchart of a display controller.
Figure 7:
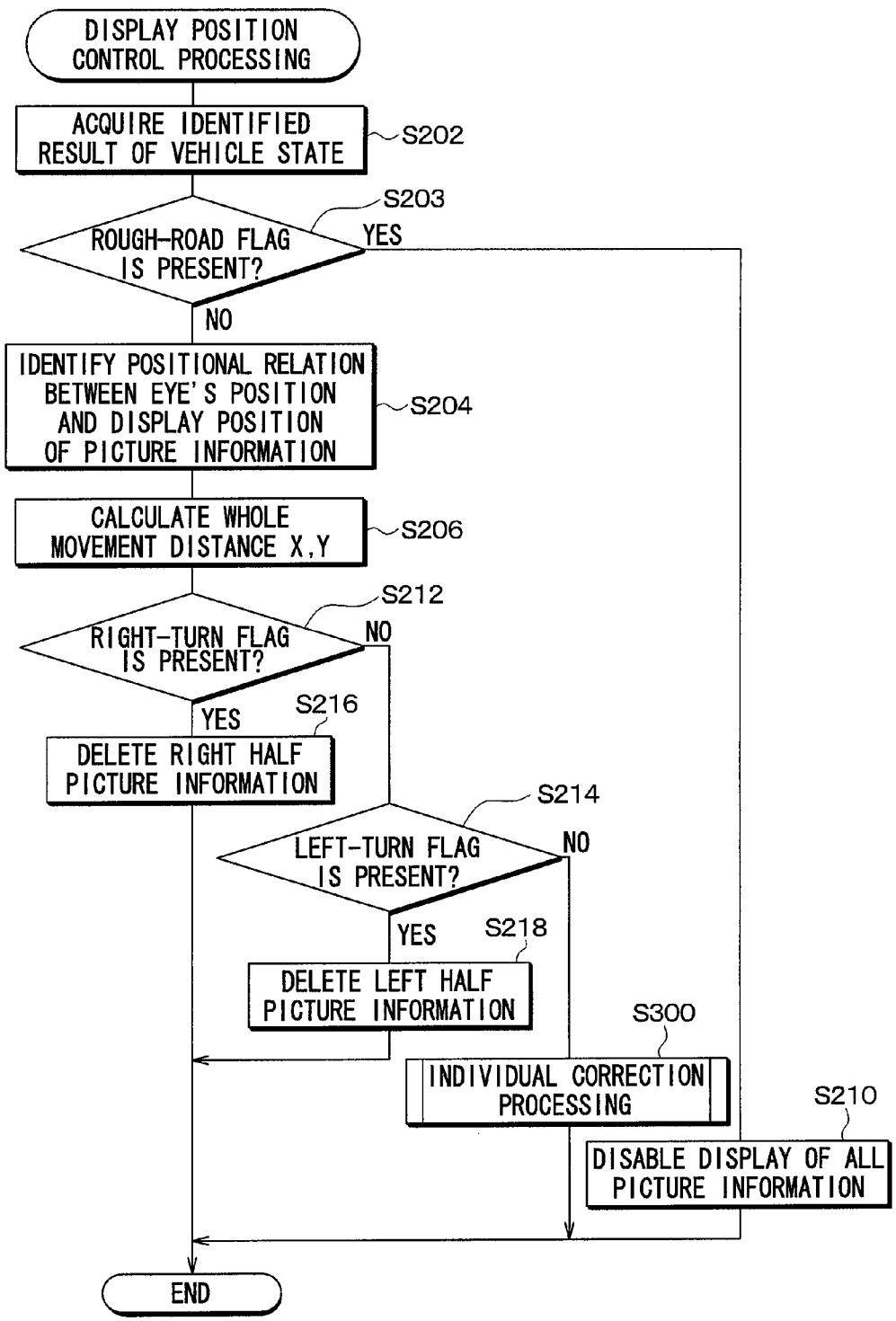
FIG. 7 is a flowchart of display position control processing.

Returning the description of FIG. 4, when the information acquisition processing S100 is finished, display position control processing is executed (S200). FIG. 7 is a flowchart of the display position control processing.

In the display position control processing, first, an identification result of the vehicle state is acquired (S202). Specifically, the result of vehicle state identified in S108 is acquired.

Next, it is determined whether the rough road flag is present (S203). Specifically, it is determined whether the rough road flag is stored in the RAM.

Figure 8:
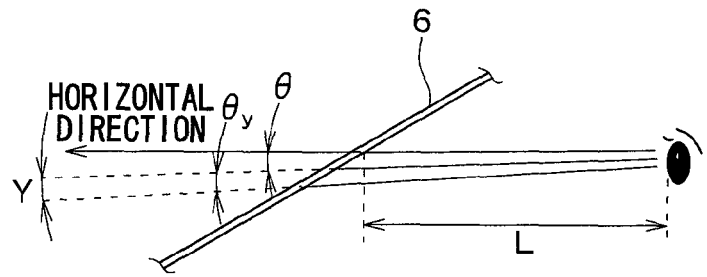
FIG. 8 is a view for describing calculation of a movement distance of picture information.

Here, when the rough road flag is stored in the RAM, NO is selected in S203 and then, positional relation between the position of the driver's eyes and the display position of particular picture information is identified (S204). FIG. 8 illustrates the state where the driver is viewing predetermined particular picture information on the wind glass 6. Here, using the position (coordinates) of the driver's eye, which is detected by the sight line detection unit 30, a horizontal distance L between the driver's eye and the wind glass 6 is identified.

Next, whole movement distances X, Y are identified (S206). In the present embodiment, the wind glass 6 is divided into a display prohibition area where display of picture information is prohibited and a display allowance area where display of picture information is allowed, to display the picture information in the display allowance area.

Figure 9:
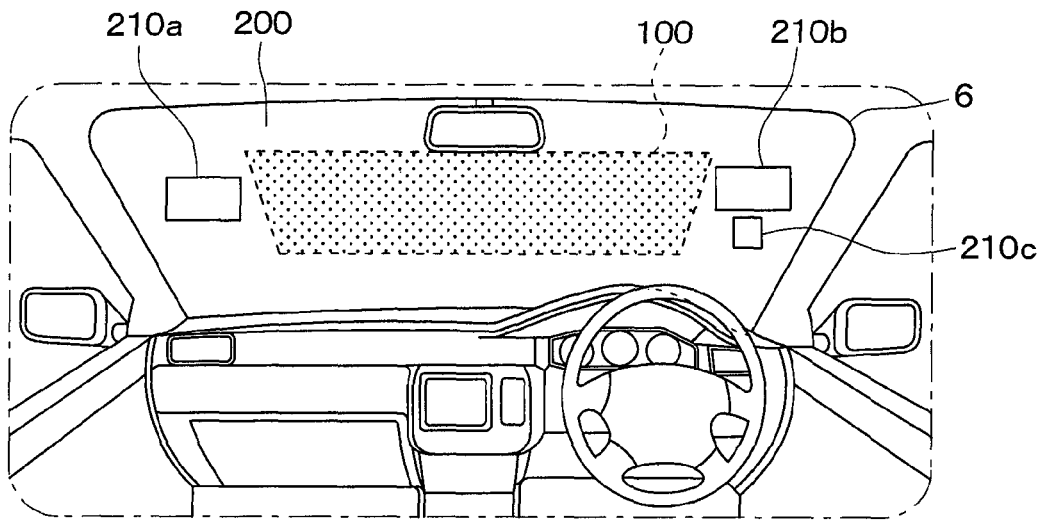
FIG. 9 is a view for describing a display prohibition area and a display allowance area.

FIG. 9 illustrates an example of display of picture information in the case where the vehicle is travelling on a flat road. As illustrated in FIG. 9, the display prohibition area 100 is centrally provided, and the display allowance area 200 surrounds the display prohibition area 100 and displays picture information. Display bodies 210a, 210b, and 210c are displayed in the display allowance area 200.

When the attitude of the vehicle changes, the whole of the display prohibition area and the display allowance area including picture information is moved so as to ensure the driver's field of view. For example, when the vehicle is travelling on an ascending slope, the whole of the display prohibition area and the display allowance area including picture information is moved downward. When the vehicle is travelling on a descending slope, the whole of the display prohibition area and the display allowance area including picture information is moved upward. When the vehicle turns right, the whole of the display prohibition area and the display allowance area including picture information is moved to right. When the vehicle turns left, the whole of the display prohibition area and the display allowance area including picture information is moved to left.

Figure 10:
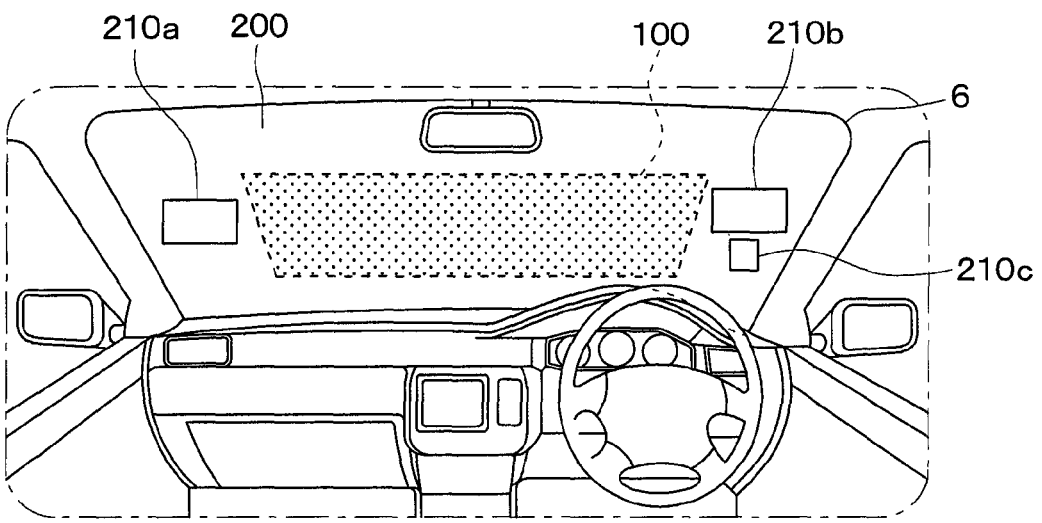
FIG. 10 is a view for describing movement of the whole of the display prohibition area and the display allowance area.

For example, when the vehicle is entering into an ascending slope, as illustrated in FIG. 10, to ensure the driver's field of view, the whole movement distance Y is calculated such that the whole of the display prohibition area 100 and the display allowance area 200 is moved downward.

Here, as illustrated in FIG. 8, in the case of an ascending slop having an angle θy, given that a horizontal distance between the driver's eyes and the wind glass 6 is L, and an angle that the direction in which the driver is viewing picture information (sight line) forms with the horizontal direction is θ, the downward movement distance Y of the picture information can be calculated as $Y=L*(\tan(\theta+\theta y))-\tan\theta$. The angle θy can be found based on the angular velocity in the pitch direction, which is detected by the 3-axis gyrosensor 26. In the case of a descending slope, the angle θy may be set to a negative value.

At right turn and left turn, the whole movement distance X of the display prohibition area 100 and the display allowance area 200 is determined using a table specifying steering angle information outputted from the wheel steering angle sensor 27 and the horizontal movement distance of the whole picture information. The whole movement distance X is determined such that the movement distance of the whole of the display prohibition area 100 and the display allowance area 200 becomes larger as the rotational angle of the steering wheel of the vehicle is larger. Here, only the whole movement distance is determined, and actual movement of display of picture information is made later.

Next, it is determined whether the right turn flag is present (S212). Specifically, it is determined whether the right turn flag is stored in the RAM.

Here, when the right turn flag is not stored in the RAM, NO is selected in S212 and then, it is determined whether the left turn flag is present (S214). Specifically, it is determined whether the left turn flag is stored in the RAM.

Here, when the left turn flag is not stored in the RAM, NO is selected in S214 and then, individual correction processing of individually correcting the display position of picture information is executed (S300).

Figure 11:
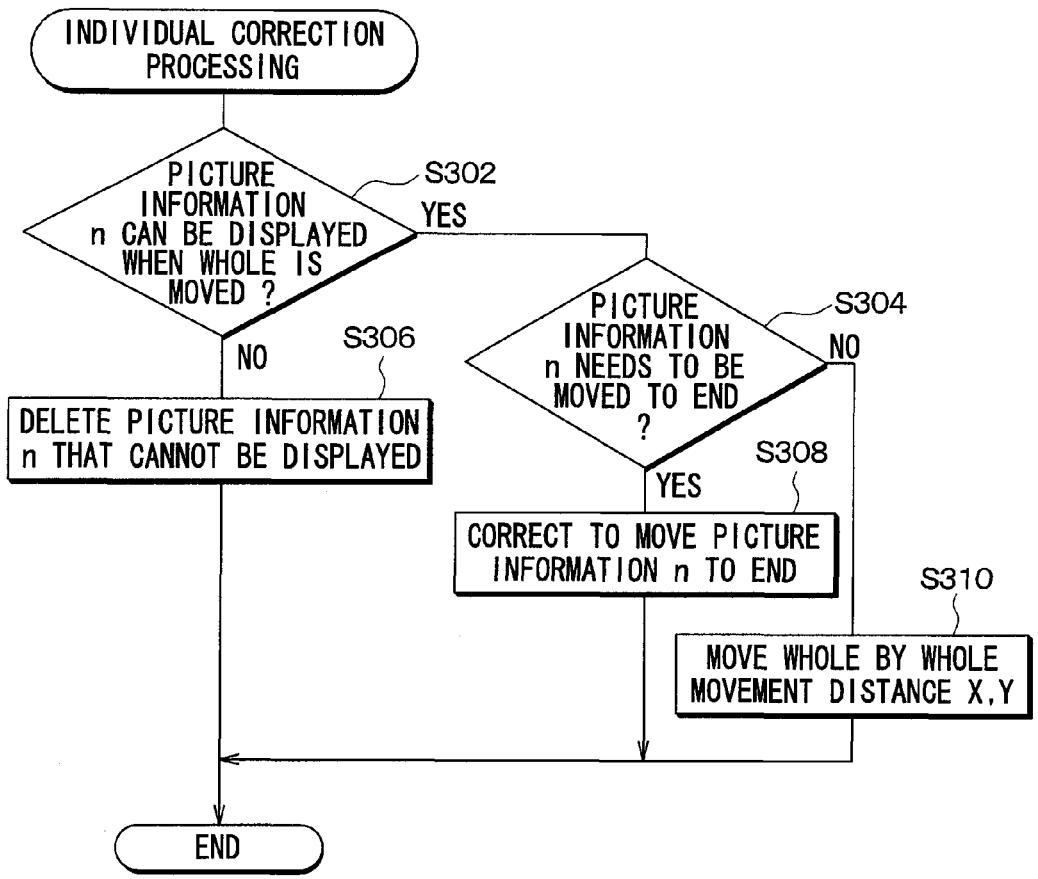
FIG. 11 is a flowchart of individual correction processing.

FIG. 11 is a flowchart of the individual correction processing. According to the individual correction processing, first, it is determined whether, even when the whole area is moved, individual picture information n that is present in the moving direction can be displayed (S302).

Figure 12:
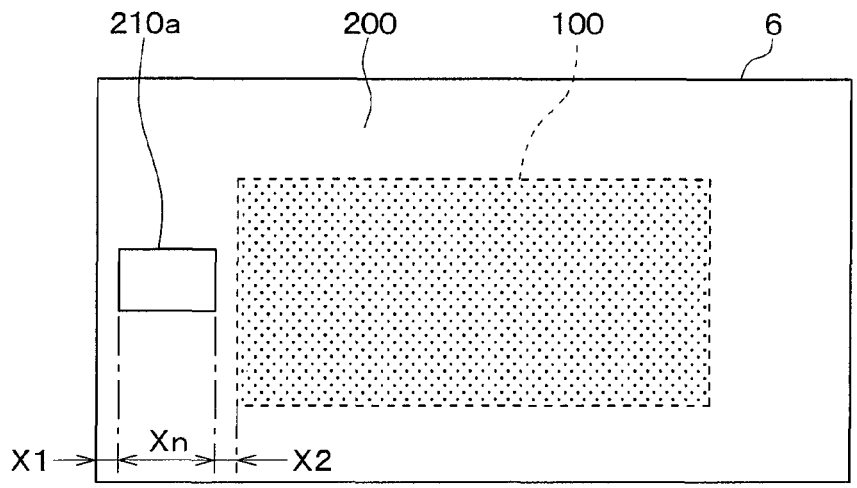
FIG. 12 is a view for describing movement of individual picture information.

Here, as illustrated in FIG. 12, it is assumed that the display body 210a having a horizontal length Xn is displayed in the display allowance area 200 located on the left side of the display prohibition area 100, a space having a length X1 is present on the left side of the display body 210a, and a space having a length X2 is present on the right side of the display body 210a.

Here, in the case where the whole of the display prohibition area 100 and the display allowance area 200 is moved to left by a movement distance X, when the leftward movement distance X is the total length (X1+X2) of the spaces located on left and right sides of the display body 210a or less, it is determined that, even when the whole area is moved, individual picture information n that is present in the moving direction can be displayed, and when the leftward movement distance X is larger than the total length (X1+X2) of the spaces located on left and right sides of the display body 210a, it is determined that, when the whole area is moved, individual picture information n that is present in the moving direction cannot be displayed.

Here, for example, when the leftward movement distance X is larger than the total length (X1+X2) of the spaces located on left and right sides of the display body 210a, NO is selected in S302 and then, the picture information n that cannot be displayed is deleted, and the whole of the display prohibition area 100 and the display allowance area 200 is moved by the movement distance calculated in S206 (S306).

Figure 13:
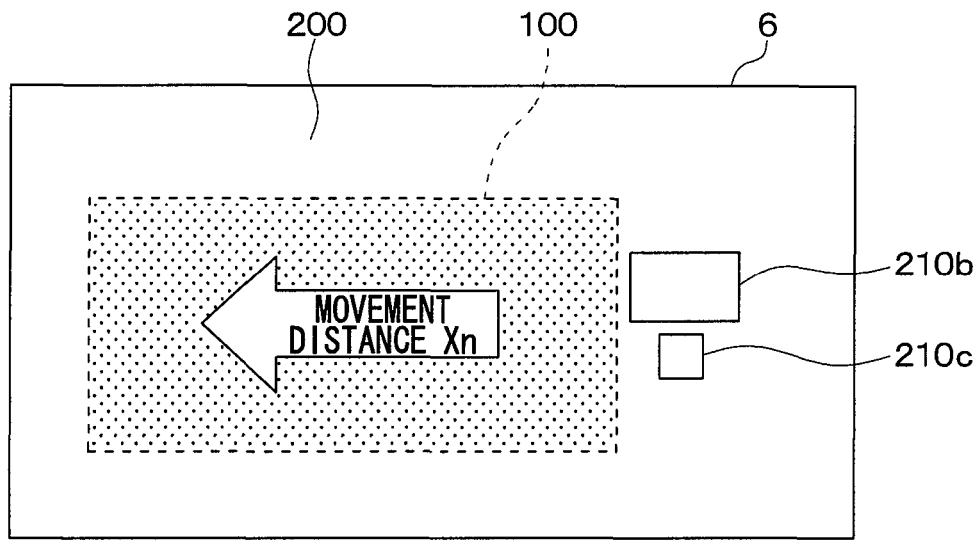
FIG. 13 is a view for describing movement of the individual picture information.

Specifically, as illustrated in FIG. 13, the display body 210a located on the left side of the display prohibition area 100 is deleted, and the optical unit 2 is controlled to move the whole of the display prohibition area 100 and the display allowance area 200 including the individual picture information n that can be displayed to left by the whole movement distance identified in S204, to finish this processing.

For example, the left movement distance X is the total length (X1+X2) of the spaces located on left and right sides of the display body 210a or less, YES is selected in S302 and then, it is determined whether the individual picture information n needs to be moved to an end (S304).

Here, in the display example illustrated in FIG. 12, in the case where the whole of the display prohibition area 100 and the display allowance area 200 is moved to left by the movement distance X, when the leftward movement distance X is the length X1 of the space on one end side (left side) of the display body 210a or less, it is determined that the area that can display the picture information without moving the individual picture information n to the end is secured, and when the left movement distance X is larger the length X1 of the space on one end side (left side) of the display body 210a, it is determined that the area that can display the picture information by moving the individual picture information n to the end is secured.

Here, for example, in the case where the leftward movement distance X is the length X1 of the space on the end side (left side) of the display body 210a or less, NO is selected in S304 and then, the whole area is moved by the whole movement distance X, Y (S310). Specifically, the optical unit 2 is controlled to move the whole of the display prohibition area 100 and the display allowance area 200 by the movement distance calculated in S206, to finish this processing.

For example, when the leftward movement distance X is larger than the length X1 of the space on the end side (left side) of the display body 210a, YES is selected in S304 and then, picture information n is moved to the end (S308).

Figure 14:
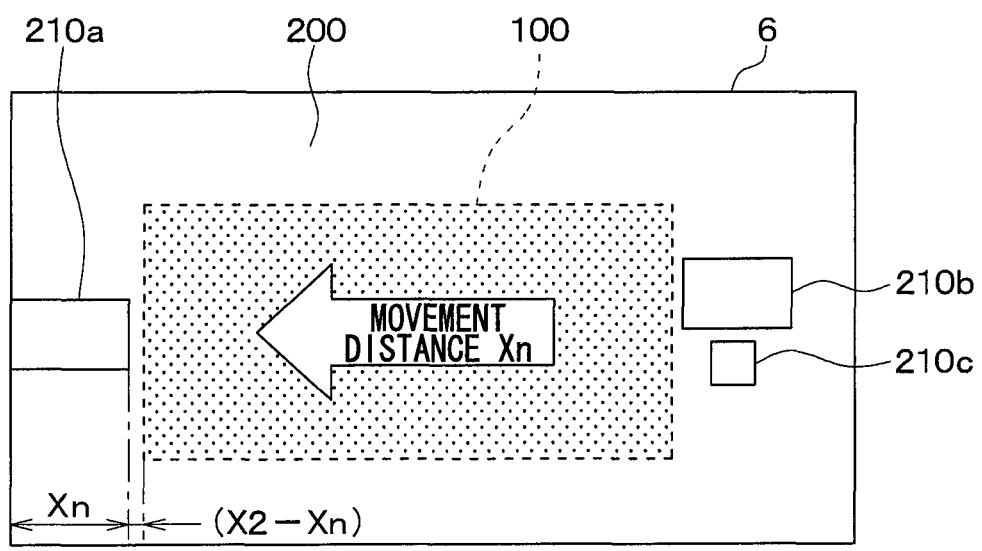
FIG. 14 is a view for describing movement of the individual picture information.

Specifically, as illustrated in FIG. 14, the optical unit 2 is controlled so as to move the display position of the display body 210a that is present in the moving direction to the end side of the display allowance area 200, and to move the whole of the display prohibition area 100 and the display allowance area 200 by the movement distance calculated in S206, to finish this processing.

Returning the description of FIG. 7, when the vehicle is travelling on a rough road, and the rough road flag is stored in the RAM, YES is selected in S203, display of all picture information is prohibited (S210). Specifically, the optical unit 2 is controlled to prohibit display of all picture information.

When the right turn flag is stored in the RAM, YES is selected in S212 and then, right half picture information is deleted (S216). That is, the optical unit 2 is controlled such that picture information included in the display allowance area that overlaps with a right half of the wind glass 6 is not displayed, and picture information included in the display allowance area that overlaps with a left half of the wind glass 6 is displayed as it is, to finish this processing.

When the left turn flag is stored in the RAM, YES is selected in S214 and then, left half picture information is deleted (S218). That is, the optical unit is controlled such that picture information included in the display allowance area that overlaps with the left half of the wind glass 6 is not displayed, and picture information included in the display allowance area that overlaps with the right half of the wind glass 6 is displayed as it is, to finish this processing.

With the above-mentioned configuration, the head-up display device 1 includes the optical unit 2 that projects picture light toward the wind glass 6 of the vehicle, and displays picture information reflected on the wind glass 6 as the virtual image, and the display controller 11 that controls the optical unit 2 so as to display the picture information on the wind glass 6. The display controller 11 can control the optical unit 2 so as to move the picture information according to the vehicle state in the direction in which the field of view of the driver of the vehicle is secured, thereby displaying the picture information at the display position suitable for the vehicle state.

The display controller 11 can move the display position of picture information downward, when it is determined that the vehicle is travelling on an ascending slope, and can move the display position of picture information upward when it is determined that the vehicle is travelling on a descending slope.

The display controller 11 can move the display position of picture information to right, when it is determined that the vehicle turns to right, and can move the display position of picture information to left when it is determined that the vehicle turns to left.

The display controller 11 can display picture information in the display allowance area 200 that allows specified picture information to be displayed on the wind glass 6.

The display controller 11 can control the optical unit so as to identify a whole movement distance by which the whole display allowance area including picture information is moved, and to move the whole display allowance area including picture information by the identified whole movement distance.

The display controller 11 can determine whether a display area for displaying picture information is secured in the display allowance area in the moving direction, when the whole display allowance area including picture information is moved by the identified whole movement distance. Then, when it is determined that the display area for displaying the picture information is not secured in the display allowance area, the display controller 11 controls the optical unit so as not to display the picture information, for which the display area is not secured. Thus, even when the whole movement distance is large, the field of view of the driver of the vehicle can be secured.

When it is determined that the display area for the picture information is secured in the display allowance area in the moving direction, the display controller 11 controls the optical unit so as to determine whether the area for displaying picture information is secured without individually moving the display position of the picture information in the moving direction to the end side of the display allowance area. Then, when it is determined that the display area for the picture information is secured without individually moving the display position of the picture information in the moving direction to the end side of the display allowance area, the display controller 11 controls the optical unit so as to wholly move the position of the display allowance area including picture information without individually moving the display position of the picture information in the moving direction to display the picture information. Therefore, the position of the display allowance area including picture information can be wholly moved without individually moving the display position of the picture information in the moving direction to display the picture information.

When it is determined that the display area for the picture information is secured by individually moving the display position of the picture information in the moving direction to the end side of the display allowance area, the display controller 11 can control the optical unit so as to wholly move the position of the display allowance area including picture information while individually moving the display position of the picture information in the moving direction to the end side of the display allowance area.

The display controller 11 determines whether the vehicle turns right or left, based on a signal corresponding to the operation of a direction indication lever for controlling a direction indicator lamp of the vehicle. Then, the display controller 11 controls the optical unit so as not to display the picture information in a right half area of the front windshield when it is determined that the vehicle turns right, and so as not to display the picture information in a left half area of the front windshield when it is determined that the vehicle turns left. Therefore, the field of view of the driver of the vehicle can be secured at right turn and left turn of the vehicle.

The display controller 11 determines whether the vehicle is travelling on a rough road having a large variation in attitude, based on information for determining whether the vehicle is travelling on the rough road having a large variation in attitude. Then, when determining that the vehicle is travelling on the rough road, the display controller 11 controls the optical unit so as not to display all of the picture information, thereby securing the field of view of the driver of the vehicle at travelling of the vehicle on the rough road.

The present disclosure is not limited to the above-mentioned embodiment, and may be variously modified as follows so as not to deviate from the subject matter of the present disclosure.

For example, in the above embodiment, the whole of the display prohibition area and the display allowance area is moved so as to ensure the driver's field of view according to the vehicle state. However, for example, the display allowance area including picture information may be moved without specifying the display prohibition area.

In the above-mentioned embodiment, the steering angle information outputted from the wheel steering angle sensor 27 is periodically acquired, a turning amount of the vehicle is estimated based on the amount of a change from the previous wheel steering angle to the current wheel steering angle, and the horizontal movement distance of the picture information is determined based on the estimated turning amount of the vehicle. However, for example, the turning amount of the vehicle may be estimated based on angular velocity information inputted from a gyrosensor, and the horizontal movement distance of the picture information may be determined based on the estimated turning amount of the vehicle.

In the above-mentioned embodiment, when the change amount of at least one of the roll angle and the pitch angle exceeds the threshold (for example, 10 degrees) for the certain period (for example, 1 second) or more, the vehicle state transitions to the state "rough road". However, the vehicle state may transition to the state "rough road" using any condition other than the above-mentioned condition, for example, based on an output signal of an acceleration sensor that detects the acceleration of the vehicle.

S108 corresponds to a vehicle state identification unit, S206 corresponds to a whole movement distance identification unit, S302 corresponds to an area securing determination unit, and S304 corresponds to an individual movement determination unit.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A head-up display device comprising:
an optical unit that projects picture light toward a front windshield of a vehicle, and displays picture information reflected on the front windshield as a virtual image;
a display controller that controls the optical unit so as to display the picture information on the front windshield; and
a vehicle state identification unit that identifies a vehicle state, wherein:
the display controller controls the optical unit so as to move a display position of the picture information in a direction in which a field of view of a driver of the vehicle is secured according to the vehicle state identified by the vehicle state identification unit;
the vehicle state identification unit identifies whether the vehicle turns right or left based on a signal corresponding to the operation of a direction indication lever for controlling a direction indicator lamp of the vehicle;

when the vehicle state identification unit identifies that the vehicle turns right, the display controller controls the optical unit so as not to display the picture information in a right half area of the front windshield; and when the vehicle state identification unit identifies that the vehicle turns left, the display controller controls the optical unit so as not to display the picture information in a left half area of the front windshield.

2. The head-up display device according to claim 1, wherein, when the vehicle state identification unit identifies the vehicle state as a state where the vehicle is travelling on an ascending slope, the display controller moves the display position of the picture information in a downward direction.

3. The head-up display device according to claim 1, wherein, when the vehicle state identification unit identifies the vehicle state as a state where the vehicle is travelling on a descending slope, the display controller moves the display position of the picture information in an upward direction.

4. The head-up display device according to claim 1, wherein, when the vehicle state identification unit identifies the vehicle state as a state where the vehicle turns right, the display controller moves the display position of the picture information in a right direction.

5. The head-up display device according to claim 1, wherein, when the vehicle state identification unit identifies the vehicle state as a state where the vehicle turns left, the display controller moves the display position of the picture information in a left direction.

6. The head-up display device according to claim 1, wherein:

the vehicle state identification unit identifies whether the vehicle is travelling on a rough road having a large variation in attitude, based on information for determining whether the vehicle is travelling on the rough road having a large variation in attitude; and when the vehicle state identification unit identifies that the vehicle is travelling on the rough road, the display controller controls the optical unit so as not to display all of the picture information.

7. A head-up display device, comprising:

an optical unit that projects picture light toward a front windshield of a vehicle, and displays picture information reflected on the front windshield as a virtual image;

a display controller that controls the optical unit so as to display the picture information on the front windshield; and a vehicle state identification unit that identifies a vehicle state, wherein:

the display controller controls the optical unit so as to move a display position of the picture information in a direction in which a field of view of a driver of the vehicle is secured according to the vehicle state identified by the vehicle state identification unit;

wherein the display controller displays the picture information in a display allowance area of the front windshield, in which picture information is enabled to be displayed;

the display controller includes a whole movement distance identification unit that identifies a whole movement distance by which the whole of the display allowance area including the picture information is moved; and the display controller controls the optical unit so as to move the whole of the display allowance area including the picture information by the whole movement distance identified by the whole movement distance identification unit.

8. The head-up display device according to claim 7, wherein:

the display controller also includes an area securing determination unit, when the whole of the display allowance area including the picture information is moved by the whole movement distance identified by the whole movement distance identification unit, the area securing determination unit determining whether a display area for the picture information is secured in the display allowance area in a moving direction; and when the area securing determination unit determines that the display area for the picture information is not secured in the display allowance area in the moving direction, the display controller controls the optical unit so as not to display the picture information for which the display area is not secured.

9. The head-up display device according to claim 8, wherein:

the picture information includes a plurality of picture information items; and when the individual movement determination unit determines that the display area for the picture information is secured by individually moving the display position of the plurality of picture information items in a moving direction to an end side of the display allowance area, the display controller controls the optical unit so as to wholly move the position of the display allowance area including the picture information while individually moving the display position of the plurality of picture information items in the moving direction to the end side of the display allowance area.

10. The head-up display device according to claim 7, wherein:

the picture information includes a plurality of picture information items;

the display controller also includes an individual movement determination unit, when the area securing determination unit determines that the display area for the picture information is secured in the display allowance area in a moving direction, the individual movement determination unit determining whether the display area for the picture information is secured without individually moving the display position of the plurality of picture information items in the moving direction to an end side of the display allowance area; and when the individual movement determination unit determines that the display area for the picture information is secured without individually moving the display position of the plurality of picture information items in the moving direction to the end side of the display allowance area, the display controller controls the optical unit so as to wholly move the position of the display allowance area including the picture information without individually moving the display position of the plurality of picture information items in the moving direction to a position in which the picture information is displayed.

* * * * *